Aug. 30, 1949.                R. G. MELROSE                 2,480,334
                    POSITION SELECTING MOTOR CONTROL SYSTEM
Filed Feb. 15, 1945                                    3 Sheets-Sheet 1
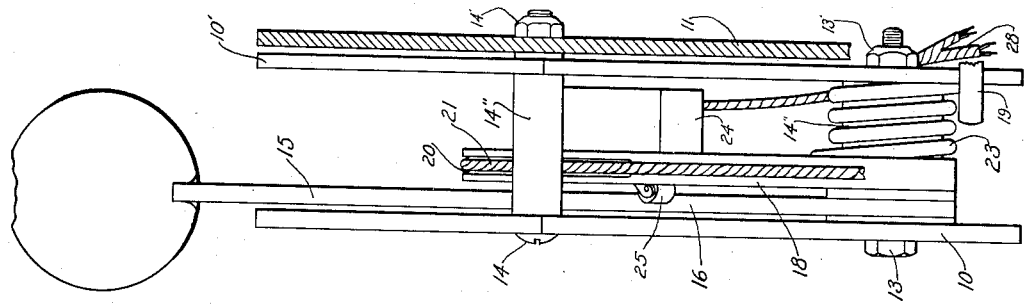
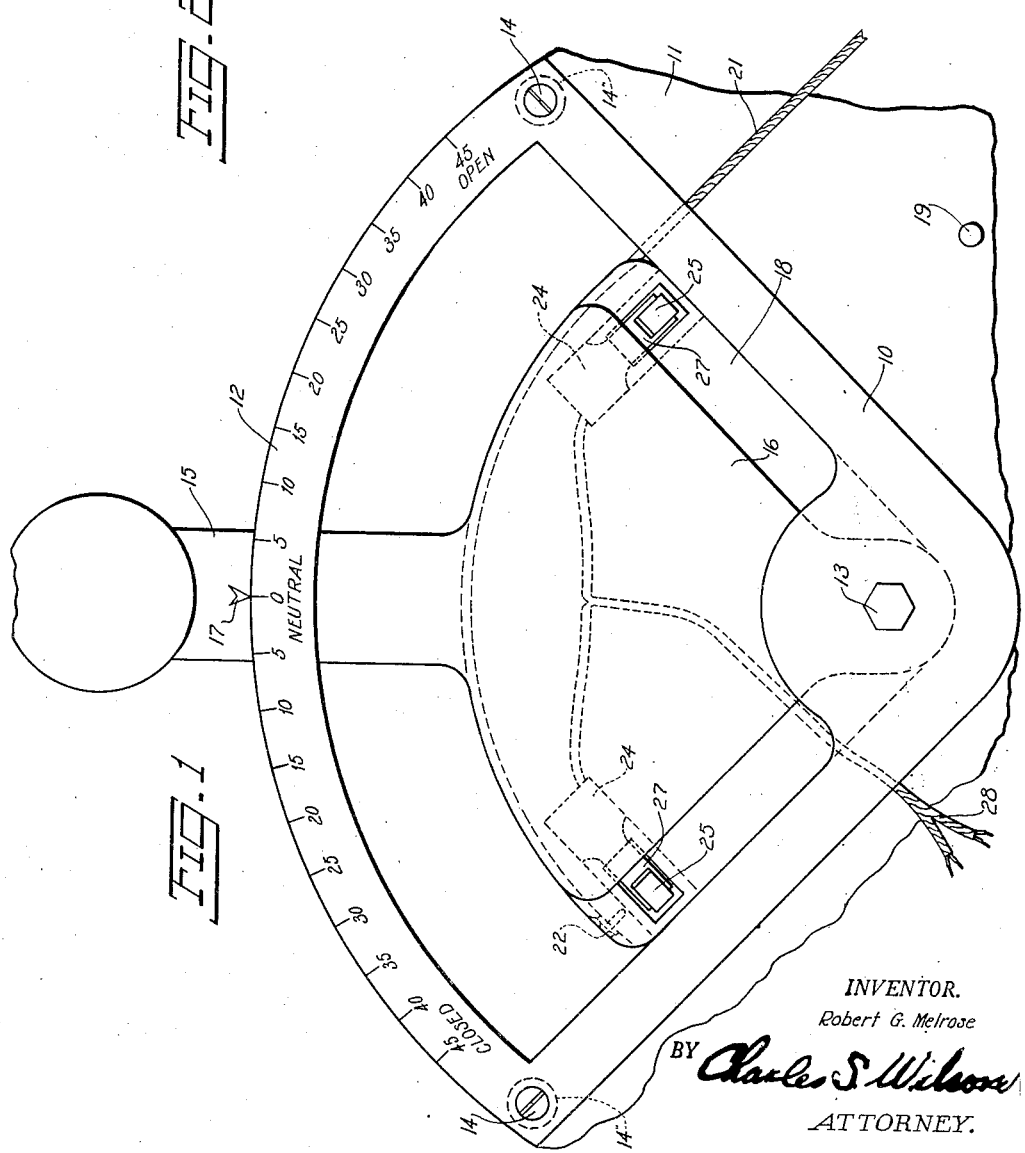
INVENTOR.
Robert G. Melrose
BY Charles S. Wilson
ATTORNEY.

Aug. 30, 1949.  R. G. MELROSE  2,480,334
POSITION SELECTING MOTOR CONTROL SYSTEM
Filed Feb. 15, 1945  3 Sheets-Sheet 2
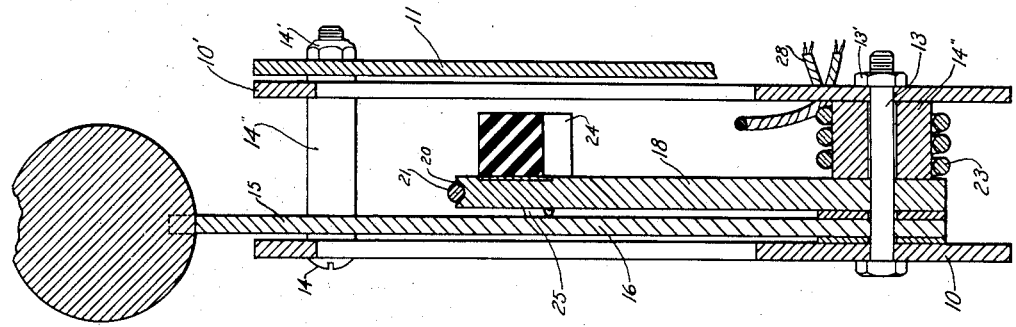
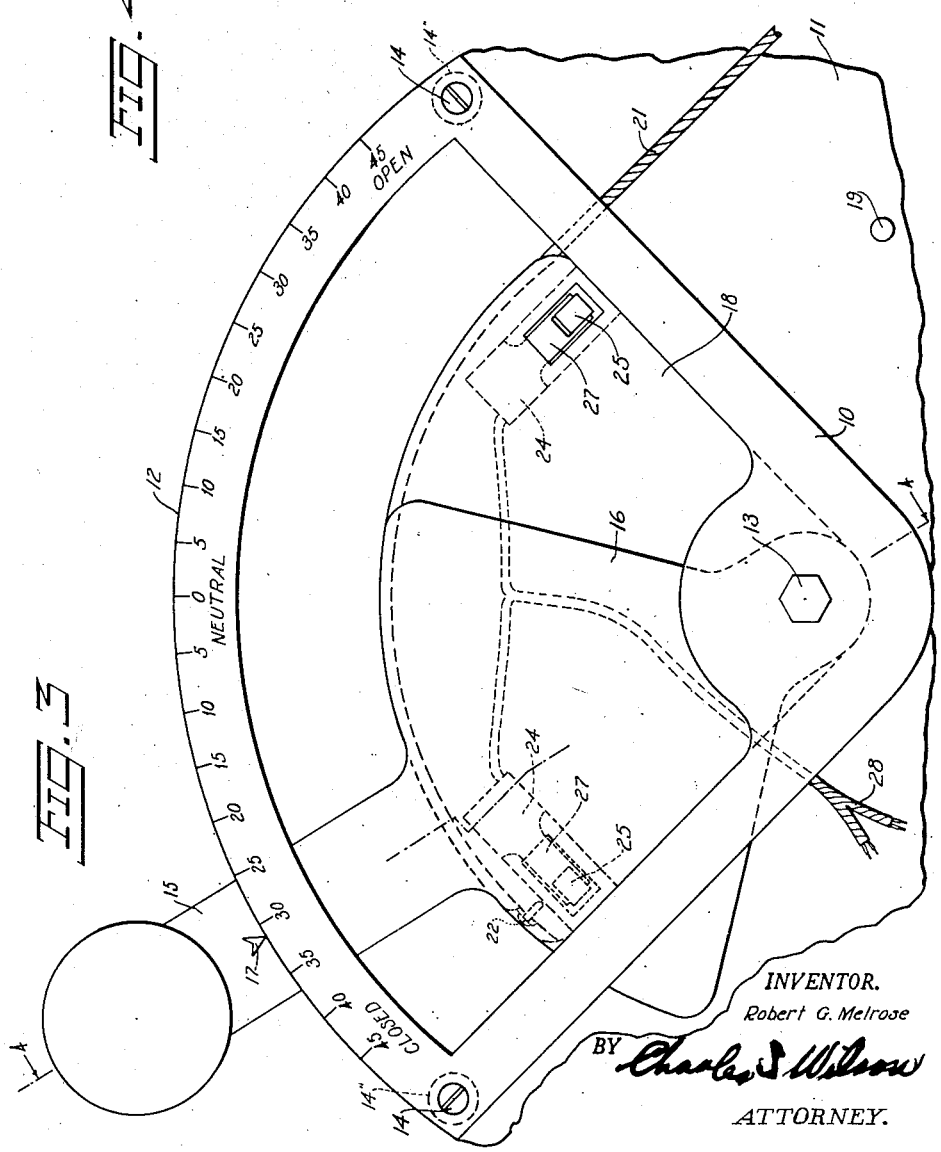
INVENTOR.
Robert G. Melrose
BY Charles S. Wilson
ATTORNEY.

Aug. 30, 1949.  R. G. MELROSE  2,480,334
POSITION SELECTING MOTOR CONTROL SYSTEM
Filed Feb. 15, 1945  3 Sheets-Sheet 3
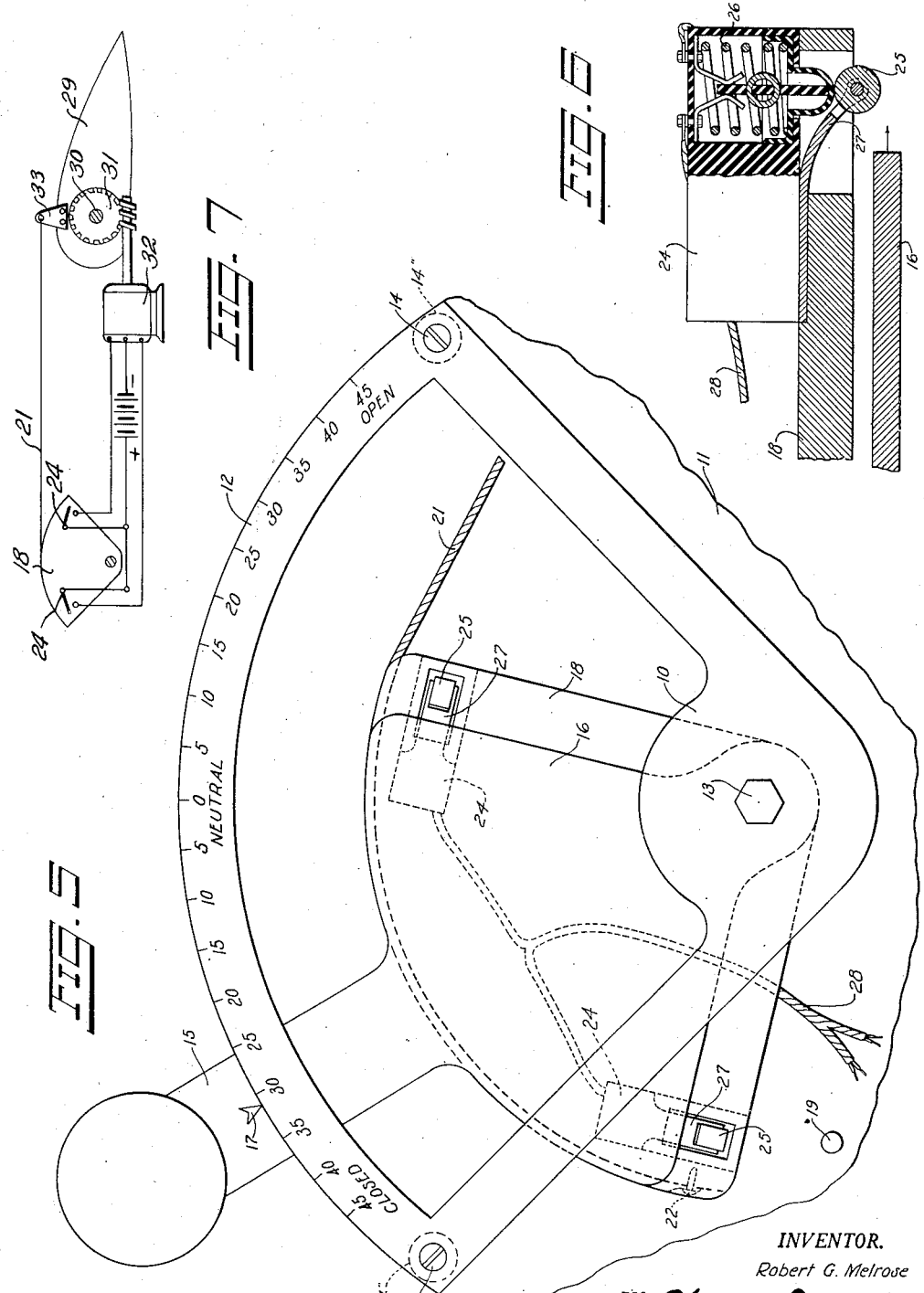
INVENTOR.
Robert G. Melrose
BY Charles S. Wilson
ATTORNEY.

Patented Aug. 30, 1949

2,480,334

UNITED STATES PATENT OFFICE 2,480,334

POSITION SELECTING MOTOR CONTROL SYSTEM

Robert G. Melrose, Centerport, N. Y., assignor to Republic Aviation Corporation, Farmingdale, N. Y., a corporation of Delaware Application February 15, 1945, Serial No. 578,016

3 Claims. (Cl. 318—31)

This invention relates to controls for regulating the operation of movable parts or elements and proposes predetermining the degree of movement of the controlled part by and from a setting of the present control.

While the present invention is of general use and application wherever movable members are to be adjusted, it is especially designed for use in conjunction with certain movable parts or elements of aircraft, such as cooler doors or flaps (cowl, dive or landing gear), etc., usually operated by electric motor drives, whereby the pilot may select, by and with the present control, the desired adjusted position for the controlled element or member and is thereafter relieved of any supervision of the control, or of the element to be adjusted, with the assurance that when the controlled element attains the adjusted position predetermined and selected by the control, its further movement is automatically arrested.

With the above and other objects in view, as will be apparent, this invention consists in the construction, combination and arrangement of parts all as hereinafter more fully described, claimed and illustrated in the accompanying drawings, wherein—

Fig. 1 is an elevation of the present control illustrating the parts thereof in their respective neutral positions.

Fig. 2 is a side elevation thereof:

Fig. 3 is a view similar to Fig. 1 disclosing a setting of the control lever away from its neutral position as shown in Fig. 1 and illustrates the relationship of the components of the control at the time of the adjustment of the control lever and prior to any adjusting movement of the controlled member or element:

Fig. 4 is a section taken through the control along line 4—4 of Fig. 3:

Fig. 5 is a view similar to Fig. 3 illustrating the relationship of the components of the control at the completion of the adjusting movement of the controlled element or member corresponding to the setting of the control lever shown in Fig. 3:

Fig. 6 is a section taken along line 6—6 of Fig. 5 to illustrate one type of switch which may be employed in conjunction with the present invention for controlling the operation of the motor moving the element or member to be adjusted; and Fig. 7 is a schematic diagram illustrating the present invention associated with a movable control surface of an aircraft.

In aircraft structures there are certain elements or parts, such as oil cooler doors, cowl flaps, dive flaps, landing gear flaps, etc., which are constantly being adjusted during flight and which are usually moved for adjustment purposes by electric motor drives. Heretofore the pilot has been compelled to manually regulate or control the operation of the motor moving the element or member being adjusted, and at the same time observe an indicator responsive to the movement of the adjusted element or member which shows the several positions attained by the member or element in its movement or adjustment. When the indicator discloses that the part or element being adjusted has attained or arrived at the desired position the pilot releases the switch controlling the operation of the motor and stops its operation. This requires more or less constant attention to the adjustment and the control thereof by the pilot which in itself is undesirable and objectionable.

The present invention proposes making this adjustment automatic upon and by the predetermining and selection of the adjusted position by the pilot, and after such position of adjustment has been attained by the movable part or member, to automatically arrest the adjusting movement thereof. To that end a selector control is provided by which the pilot may select any position within the range of possible adjustment desired for the controlled part or member, whereupon the motor controlling the same becomes instantly and automatically effective and remains effective until the part reaches the selected or predetermined adjusted position, when the operation of the motor is automatically arrested. In this manner the pilot once having selected the adjusted position for the controlled part or member is relieved of further attention to the control or the part or member to be adjusted.

Reference being had more particularly to the drawings, 10 designates a fixed or stationary frame or quadrant secured to and spaced from a companion frame or plate 10' which in turn is fixedly secured to a part 11 of the aircraft structure. This quadrant 10 carries a scale 12 which coacts with the control lever 15, in a manner to be hereinafter more fully described, to predetermine or select the adjusted position of the controlled door or aircraft element. A pivot pin 13 is positioned between the quadrant 10 and the plate 10' and cooperates with the mounting bolts 14, to mount and support the quadrant 10 and the plate 10' on the structure 11. Spacers 14'' are mounted on the pin 13 and bolts 14 to maintain the quadrant 10 spaced from the plate 10' and/or the structure 11. Suitable fastening means, such as the nuts 13'—14', operate on the pin 13 and the bolts 14 not only to secure the quadrant 19 and the plate 10' together, but also to mount the entire assembly upon the fixed part 11 of the aircraft structure. For this latter purpose the nuts or fastening means 13'—14' may be removed so that the projecting ends of the bolts 13—14 may pass through corresponding apertures in the structural part 11 of the aircraft after which the nuts 13'—14' may be replaced thereby effectively mounting the device as a unit. It is to be understood however that this mounting of the device is a matter of mechanical expediency and may be widely varied without in any way effecting this invention or its operation. In fact, if desired, the plate 10' may be entirely eliminated and the instant device mounted directly upon the structural part 11 of the aircraft, in which event the structure 11 performs all of the functions of the plate 10' and the quadrant 19 is supported in spaced relation thereto by the spacers or sleeves 14''.

A control lever 15 is pivotally mounted upon the pin 13 and in swinging thereon may move from one end of the scale 12 to the opposite end thereof. This lever 15 has a control plate 16, of generally triangular shape, secured thereto or formed integrally therewith, with its base parallel to the scale 12 and its apex adjoining the pivot pin 13. The pins 14 and spacers 14'' contact with the lever 15 at the limits of its path of movement and thereby define such path which is substantially coextensive with the scale 12. The lever 15 carries an indicator or pointer 17 which cooperates with or overrides the scale 12 to indicate thereon the position occupied by the lever as well as the position predetermined or selected for the controlled part or member upon its adjustment.

A follower plate 18 is mounted for pivotal movement on the pin 13 to the rear of the control plate 16 of the lever 15 and this follower plate 18 is also substantially triangular in shape with its apex pivoted on the pin 13. The base or widest edge of the follower 18 substantially coincides with that of the control plate 16 but is longer than the latter. It is to be noted that the follower plate 18 has generally a greater width than the control pltae 16 and that its side edge portions therefore will project beyond the corresponding edges of plate 16 when the centers of both plates coincide as shown in Figs. 1 and 5. The pivotal movement of the follower plate 18 on the pivot pin 13 is limited by appropriate stops 19 fixed to the aircraft structure 11 or to the plate 10' at the extremities of the path of movement proposed for the follower 18.

The upper edge of the follower plate is grooved, as at 20, for the reception of the cord or cable 21. At one of its ends the cord or cable 21 is secured, as at 22, in one extremity of the groove 20 while its body is seated in the groove 20 and passes along the edge of the follower plate 18 to extend to and be secured to the movable controlled part or member. A coil spring 23 encircles the pivot pin 13 and is secured at one of its ends to the follower plate 18 and at its opposite end to the plate 10' or in the alternative of the structure 11 if the plate 10' is omitted from the assembly. As the follower plate 18 moves in one direction, for example to the right in Figs. 1, 3 and 5, under the control of the cable 21, it becomes increasingly spring loaded, and reversely when the tension on it is relaxed or is removed from the cable 21, as by the reverse operation of the motor moving the controlled element or part, this spring loading of the follower 18 will cause it to move in the opposite direction. Thus, in one direction the follower 18 is moved by the cable 21 which in turn is placed under tension by the movement of the controlled member or element of the aircraft in one direction and in the opposite direction is moved by the spring 23 as the tension on the cable 21 is relaxed by the reverse movement of the controlled element or member.

Adjacent each side of the follower plate 18 an electrical switch 24, such as illustrated in detail in Fig. 6, is mounted to be controlled by a roller 25. This roller 25 is normally projected into the path of movement of the controlled plate 16 by any suitable means, for example by the spring 26 of the switch or by a leaf spring 27 carrying the roller 25 or by both of them. In any event, the position of the roller 25 determines the closing and opening of the switch 24 and its position in turn, is controlled by the plate 16. When the roller 25 is free of contact with the control plate 16 its switch 24 is open, but when the roller 25 is in contact with or is overridden by the control plate 16 it is forced inwardly of the follower plate 18 against the forces or springs normally projecting it in the opposite direction or outwardly of the follower, and in being so forced inwardly of the follower 18 closes the switch 24 and the circuit including it, thereby initiating the operation of the electric motor operating the controlled element or member. The switch 24 will remain closed and the motor will continue to operate so long as the control plate 16 contacts with or overrides one or the other of the rollers 25.

The assembled control as above described, consists of this control lever 15 and plate 16 which is freely movable on the pivot pin 13 and in being so moved can be positioned at any point on the scale 12 corresponding to the position to which the part or member under adjustable control is to be moved. This movement of the lever 15 and plate 16 is not transmitted to the follower 18 but does cause the plate 16 to override one or the other of the rollers 25 dependent upon the direction in which the lever 15 is swung, thereby closing its coacting switch 24 that in turn closes the circuit of the motor causing it to rotate and move the part or member to be adjusted. The adjusing movement of this part or member results in the movement of the follower 18, either by the spring 23 or by the cable 21, until the previously depressed roller 25 rides free of the then stationary control plate 16 whereupon the roller 25 moves outwardly of the follower 18 breaking the circuit by means of which the operation of the motor is controlled.

The motor moving the controlled member or element is reversible so that its operation in either direction will move the element or member correspondingly. Two switches 24 are provided, one at each edge of the follower 18 and the closing of one of these switches causes the motor to operate in one direction while the alternate closing of the other switch results in the reverse operation of the motor. By the present construction only three operative conditions are possible, to wit: both switches 24 open, or one switch open while the other is closed, or reversely the switch previously closed is open and that previously open is closed. These conditions result from the relative positions of the plates 16 and 18 and that is initially determined by the position of the lever 15 relative to the scale 12.

The connections between the switches 24 and the motor follows standard technique. For that purpose the wires 28 are carried by the follower plate 18 and are connected to the switches 24 and with the reversible motor employed for the operation of the controlled element or member in the usual and standard manner.

In Fig. 1 is disclosed the central or neutral positions of all the components of the present invention. Here the lever 15 is shown at "0" on the scale 12 and the control plate 16 thereof lies between and out of contact with the rollers 25 of the switches 24 carried by the follower plate 18. When the elements are so situated the circuits, including the switches 24 for the control of the motor are open and the controlled part or member is stationary. The movement of the control lever 15 to any adjusted position on either side of "0" on the scale 12, as for instance to the position shown in Fig. 3, causes the control plate 16 thereof to ride over one or the other of the rollers 25 (in Fig. 3 shown as the roller 25 of the switch 24 to the left) closing its coacting switch 24. This closes one of the circuits controlling the operation of the motor setting the latter in motion to move the controlled member or element, the movement of which in turn causes the follower plate 18 to move in the direction of the setting of the lever 15 under the impetus of the spring 23, or, in the alternative, under the control of the cable 21. In Fig. 3 this movement of the follower 18 is by virtue of the force exerted thereon by the spring 23. The follower plate 18 continues its movement until the roller 25 carried thereby, which has been previously depressed by the control plate 16, as illustrated in Fig. 3, passes beyond the edge of the control plate 16 as shown in Fig. 5, whereupon such depressed roller 25 moves outwardly of the follower 18 opening the cooperating switch 24 and breaking the circuit, whereupon the operation of the motor and movement of the controlled part or member ceases, as does also the pivotal movement of the follower 18. A reverse movement on the part of the lever 15 causes the reverse operation of the motor to place the cable 21 under tension and move the follower 18 against the action of the spring 23 in the opposite direction.

In short, the movement of the lever 15 from any position where the centers of the plates 16 and 18 coincide, and with both switches 24 open, as illustrated in Figs. 1 and 5, closes one or the other of the switches 24 thereby energizing the motor and initiating the movement of the controlled member or element. This movement of the controlled element or member causes the follower 18 to swing in one direction or the other upon the pin 13 which movement continues until the relative positions of the plates 16 and 18 as illustrated in Figs. 1 and 5 are attained, whereupon the closed switch 24 opens and the entire movement is arrested.

The wiring, the structure controlled by the instant invention, the motor and the construction per se of the switches 24 respectively form no part hereof and therefore are not illustrated and described in detail. However, Fig. 7 schematically illustrates the instant invention in combination with a movable control surface 29 of an aircraft. In this particular example, the movable control surface 29 is fixedly mounted on a shaft 30 and is rotated through a predetermined arc, concentric to that shaft, by means of a worm gear train 31 and a reversible electric motor 32. A bellcrank or horn 33 is fixedly mounted on the control surface 29 and the cable 21 has one end thereof fastened to the bellcrank 33, while its other end is attached to the follower plate 18 as above described. The switches 24 control the operation of the motor 32 in either direction so that upon the closing of one of the switches 24 the motor 32 rotates the control surface 29. The resulting displacement of the bellcrank 33 either places the cable 21 under tension, thereby rotating the follower plate 18 in a clockwise direction, or relieves the static tension in the cable 21 to permit the spring 23 to rotate the follower plate 18 in a counterclockwise direction. In either case, as the control surface 29 reaches the position predetermined by the adjustment of the lever 15, the follower plate 18 moves into parallel alignment or coincidence with the control plate 16 and the actuated switch 24 opens, thereby arresting operation of the motor 32, and the rotation of the control surface 29. While the present invention has been described in conjunction with a movable part or element of an aircraft and in conjunction with electrical operating drives, it is of course manifest that it can be employed for selecting or predetermining the position to which any movable member is to be adjusted by any adaptable power means, regulated and controlled by any suitable device as a substitute for the switches 24, all without departing from the spirit and scope hereof.

What is claimed is:

1. In a selector control for predetermining the adjustment of a movable member the combination with a pair of parallel plates, each plate being a sector of a disc and both plates being mounted adjacent one to the other for independent movement on a common pivot, one thereof being wider to extend beyond the limits of the other when their respective center lines coincide, of means for moving the narrower of said plates in either direction to a predetermined adjusted position thereby causing it to overlap one of the edge portions of the wider plate, a reversible motor for actuating the movable member in either direction, means for moving the wider plate from and in unison with the movement of the member being adjusted, and means carried by the edge portions of the wider of said plates to be actuated by the narrower plate when overlapping one or the other of the edge portions of the wider plate for controlling the operation of the motor to initiate the movement of the member being adjusted.

2. A selector control assembly for the adjustment on a common pivot, each of said plates being parallel plates mounted for independent movement on a common pivot, each of said plates being the sector of a disc and one of said plates being smaller than the other and constituting an adjustable control plate and the larger of said plates constituting a follower, said plates being organized and arranged so that the centers thereof coincide when the assembly is inoperative with the edge portions of the follower projecting beyond the limits of the control plate, a motor for the operation and adjustment of the movable member, a connection between the follower and the movable member under adjustment whereby the follower moves independently of the control plate and in unison with said member, and means carried on the edge portions of the follower plate projecting beyond the limits of the control plate when the device is inactive to be actuated by the control plate on its movement out of coincidence with the follower, in either direction, for initiating the operation of the motor and the adjustment of the movable member.

3. A selector control for the adjustment of a movable member comprising a control plate and a follower plate each plate being the sector of a disc and both plates being mounted in spaced parallel relationship and for independent movement on a common pivot, the follower plate being wider than the control plate to have the marginal edge portions thereof normally extending beyond the limits of the control plate when the center lines of the plates coincide, a reversible motor for the operation and adjustment of the movable member, a switch carried on each marginal portion of the follower plate, said switches respectively controlling the actuation of the motor in opposite directions for the corresponding adjustment of the movable member, a lever carried by said control plate for displacing it out of its normal position to thereby project it over one or the other of the marginal portions of the follower plate to operate the switch carried by such marginal portion of the follower plate, a cable directly connecting the follower plate and the member under adjustment whereby the follower plate is moved in one direction in unison with the member under adjustment until the normal relative positions of the plates is resumed, and a spring interposed between the follower plate and its pivot to move the follower plate in the opposite direction in unison with the movable member as the cable connecting the movable member and the follower plate is relaxed by the adjustment of the movable member and until the normal relative positions is resumed.

ROBERT G. MELROSE.

REFERENCES CITED

The following references are of record in the file of this patent:

UNITED STATES PATENTS

| Number | Name | Date |
|---|---|---|
| 2,355,587 | Reeves | Aug. 8, 1944 |